(12) United States Patent
Rittershofer et al.

(10) Patent No.: US 11,039,574 B2
(45) Date of Patent: Jun. 22, 2021

(54) SYSTEM TO REDUCE MATERIAL ACCUMULATION ON TOP OF A POWER RESIDUE SPREADER ON AN AGRICULTURAL COMBINE

(71) Applicant: DEERE & COMPANY, Moline, IL (US)

(72) Inventors: Martin Rittershofer, Kaiserslautern (DE); Gregor Diessner, Schweigen-Rechtenbach (DE); Marco Broschart, Herschberg (DE); Oliver Klein, Saarlouis (DE)

(73) Assignee: DEERE & COMPANY, Moline, IL (US)

( * ) Notice: Subject to any disclaimer, the term of this patent is extended or adjusted under 35 U.S.C. 154(b) by 174 days.

(21) Appl. No.: 16/121,811

(22) Filed: Sep. 5, 2018

(65) Prior Publication Data
US 2019/0090428 A1 Mar. 28, 2019

Related U.S. Application Data

(60) Provisional application No. 62/562,159, filed on Sep. 22, 2017.

(51) Int. Cl.
*A01F 12/44* (2006.01)
*A01F 12/39* (2006.01)
(Continued)

(52) U.S. Cl.
CPC ........ *A01F 12/442* (2013.01); *A01D 41/1243* (2013.01); *A01D 75/282* (2013.01);
(Continued)

(58) Field of Classification Search
CPC ........ A01F 12/40; A01F 29/12; A01F 12/442; A01F 12/39; A01F 12/60; A01D 41/1243; A01D 75/282; A01D 61/02
See application file for complete search history.

(56) References Cited

U.S. PATENT DOCUMENTS

| 3,103,241 A | 9/1963 | Weigel |
| 4,913,679 A | 4/1990 | Bender |

(Continued)

FOREIGN PATENT DOCUMENTS

| DE | 202016107495 U1 | 6/2017 | |
| EP | 2384610 A2 * | 11/2011 | ......... A01D 41/1243 |
| EP | 2368417 A1 | 9/2012 | |

OTHER PUBLICATIONS

European Search Report, EP 18195716.8, dated Feb. 12, 2019, pp. 1-8.

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A spreader of a combine for conveying crop residue rearwardly from a rotor assembly includes a frame coupled to the combine and has a top portion adapted to receive a portion of crop residue during a harvesting operation. An impellor includes one or more blades for rotatably conveying crop residue rearwardly, and an actuator is controllably moved between an extended position and a retracted position. The actuator is pivotally coupled to the combine. A linkage assembly is pivotally coupled to the actuator at one end and to the frame at another end. The spreader is disposable in a first position when the actuator is in the extended position, and the spreader is disposable in a second position when the actuator is in the retracted position. A movement from the extended position to the retracted position induces pivotal movement of the spreader from the first position to the second position.

20 Claims, 6 Drawing Sheets

(51) Int. Cl.
A01D 41/12 (2006.01)
A01D 75/28 (2006.01)
*A01F 12/40* (2006.01)
*A01D 61/02* (2006.01)
*A01F 12/60* (2006.01)

(52) U.S. Cl.
CPC .............. *A01F 12/39* (2013.01); *A01D 61/02* (2013.01); *A01F 12/40* (2013.01); *A01F 12/60* (2013.01)

(56) References Cited

U.S. PATENT DOCUMENTS

| | | | |
|---|---|---|---|
| 6,416,405 B1* | 7/2002 | Niermann | A01D 41/1243 241/186.3 |
| 6,547,169 B1* | 4/2003 | Matousek | A01D 41/1243 239/661 |
| 6,719,627 B2* | 4/2004 | Wolters | A01F 12/40 460/111 |
| 7,008,315 B2 | 3/2006 | Redekop et al. | |
| 7,220,179 B2 | 5/2007 | Redekop et al. | |
| 7,331,855 B2* | 2/2008 | Johnson | A01D 41/1243 460/112 |
| 7,354,341 B1 | 4/2008 | Smith et al. | |
| 7,544,126 B2 | 6/2009 | Lauer et al. | |
| 8,118,651 B2 | 2/2012 | Weichholdt et al. | |
| 8,585,475 B2* | 11/2013 | Isaac | A01D 41/1243 460/111 |
| 8,864,561 B2* | 10/2014 | Weichholdt | A01D 41/1243 460/112 |
| 9,497,903 B2 | 11/2016 | Biggerstaff | |
| 9,686,916 B2* | 6/2017 | Biggerstaff | A01D 41/1243 |
| 9,743,586 B2* | 8/2017 | Biggerstaff | A01D 41/1243 |
| 10,306,834 B2* | 6/2019 | Ballegeer | A01D 41/1243 |
| 10,375,885 B2* | 8/2019 | Puryk | A01F 12/40 |
| 2003/0003974 A1* | 1/2003 | Niermann | A01D 41/1243 460/111 |
| 2006/0073860 A1 | 4/2006 | Redekop | |
| 2009/0088231 A1* | 4/2009 | Murray | A01D 41/1243 460/111 |
| 2009/0325659 A1* | 12/2009 | Overschelde | A01F 12/40 460/112 |
| 2010/0184494 A1 | 7/2010 | Klein | |
| 2011/0053668 A1* | 3/2011 | Weichholdt | A01F 12/40 460/112 |
| 2013/0263565 A1* | 10/2013 | Yde | A01D 41/1243 56/122 |
| 2014/0364179 A1* | 12/2014 | Brinkmann | A01D 41/1243 460/112 |
| 2015/0351322 A1* | 12/2015 | Desmet | A01D 41/1243 460/114 |
| 2016/0044869 A1* | 2/2016 | Mayerle | A01F 12/58 460/1 |
| 2016/0150727 A1* | 6/2016 | Mayerle | A01F 12/10 460/112 |

OTHER PUBLICATIONS https://www.sloanex.com/s-series-combine-tailboard-trash-tube-fits-john-deere.html, publicly available as early as Aug. 9, 2017.

\* cited by examiner

SYSTEM TO REDUCE MATERIAL ACCUMULATION ON TOP OF A POWER RESIDUE SPREADER ON AN AGRICULTURAL COMBINE

RELATED APPLICATIONS

This application claims the benefit of U.S. Provisional Patent Application Ser. No. 62/562,159, filed Sep. 22, 2017, the disclosure of which is hereby incorporated by reference in its entirety.

FIELD OF THE DISCLOSURE

The present disclosure relates to agricultural combines. More particularly, it relates to residue spreaders for agricultural combines. Even more particularly, the disclosure relates to powered residue spreaders extending from the rear of agricultural combines.

BACKGROUND OF THE DISCLOSURE

Modern combines harvest agricultural crops, separate grain from unwanted plant matter, and then spread the unwanted plant matter (residue) over the ground. It is beneficial to spread residue evenly over the ground as the combine passes through the field harvesting crops. As the width of agricultural harvesting head's increases, it is more difficult to evenly spread the material over an increasingly greater width. For that reason, powered residue spreaders have been fixed to the residue outlets of the combines. These powered residue spreaders typically use rotating band like structures to disperse the residue widely side to side behind the combine.

One problem, however, with powered residue spreaders is that lighter or more fluffy material can accumulate on top of the spreader itself, thus blocking airflow out of the combine.

Thus, there is a need to provide one or more means for preventing the buildup of residue on top of the residue spreader.

SUMMARY

In one embodiment of the present disclosure, a spreader of a combine for conveying crop residue rearwardly from a chopper rotor assembly includes a frame configured to be coupled to a rear portion of the combine, the frame including a top portion adapted to receive a portion of crop residue during a harvesting operation; an impellor comprising one or more blades for rotatably conveying crop residue rearwardly; an actuator controllably moved between an extended position and a retracted position, the actuator being pivotally coupled to the combine; a linkage assembly pivotally coupled to the actuator at one end and to the frame at another end; wherein, the spreader is disposable in a first position when the actuator is in the extended position, and the spreader is disposable in a second position when the actuator is in the retracted position; wherein, a movement from the extended position to the retracted position induces pivotal movement of the spreader from the first position to the second position; wherein, in the second position, an accumulation of crop residue on the top portion falls off therefrom.

In one example of this embodiment, the actuator comprises an electric actuator, a hydraulic actuator, a mechanical actuator, an electro-hydraulic actuator, a pneumatic actuator, or a combination thereof. In a second example, the linkage assembly comprises a plate pivotally coupled to the actuator, the plate defining an arcuate slot through which a pin fixed to the combine moves. In a third example, a first stop is defined by a first end of the slot and a second stop defined by a second end of the slot, the first end being opposite the second end.

In a fourth example, the pin is located at the first stop in the first position and at the second stop in the second position. In a fifth example, the plate pivots with respect to the combine as the pin moves within the slot between the first and second ends. In a sixth example, the linkage assembly comprises a first link having a first end and a second end, the first end being pivotally coupled to the plate and the second end being coupled to the frame. In a seventh example, a second actuator is disposed on an opposite side of the spreader from the first actuator and is pivotally coupled to the combine, the second actuator controllably moved between an extended position and a retracted position; a second linkage assembly is disposed on the same side of the spreader as the second actuator, the second linkage assembly is pivotally coupled to the second actuator at one end and to the frame at another end.

In an eighth example, at least one rod couples the first actuator and the second actuator to one another, the at least one rod is configured to synchronously control pivotal movement of the spreader between the first and second positions. In a ninth example, a control system is provided for controlling the actuator between its extended and retracted positions.

In another embodiment of the present disclosure, a combine harvester, includes a housing including a rear hood and opposite side walls which define an interior; a blower disposed in the interior of the housing, the blower configured to generate an air stream in a substantially rearward direction; a cleaning system disposed in the interior at a location rearward of the blower, the cleaning system separating residue from a crop material such that the residue is transported via the air stream rearwardly to be discharged from the housing; a chopper rotor assembly disposed within the interior and comprising a chopper rotor mounted about a hub for rotation about an axis defined by the hub and a plurality of blades coupled to the hub of the chopper rotor for chopping the residue as it is received via the air stream; a chopper housing disposed within the interior and defining an inlet opening for receiving the residue being transported via the air stream from the cleaning system and an outlet spaced rearward from the chopper rotor for discharge of the chopped residue from the interior of the housing; a spreader configured to convey crop residue rearwardly from the chopper rotor assembly, the spreader including a frame coupled to a rear portion of the combine and having a top portion adapted to receive a portion of crop residue during a harvesting operation; an impellor of the spreader comprising one or more blades for rotatably conveying crop residue rearwardly; an actuator controllably moved between an extended position and a retracted position, the actuator being pivotally coupled to the combine; a linkage assembly pivotally coupled to the actuator at one end and to the frame at another end; wherein, the spreader is disposable in a first position when the actuator is in the extended position, and the spreader is disposable in a second position when the actuator is in the retracted position.

In a first example of this embodiment, a movement from the extended position to the retracted position induces pivotal movement of the spreader from the first position to the second position. In a second example, the linkage assembly comprises a plate pivotally coupled to the actuator, the plate defining an arcuate slot through which a pin fixed to the combine moves. In a third example, a first stop is defined by a first end of the slot and a second stop is defined by a second end of the slot, the first end being opposite the second end.

In a fourth example, the pin is located at the first stop in the first position and at the second stop in the second position. In a fifth example, a second actuator disposed on an opposite side of the spreader from the first actuator and being pivotally coupled to the combine, the second actuator controllably moved between an extended position and a retracted position; a second linkage assembly disposed on the same side of the spreader as the second actuator, the second linkage assembly pivotally coupled to the second actuator at one end and to the frame at another end; and at least one rod coupling the first actuator and the second actuator to one another, the at least one rod configured to synchronously control pivotal movement of the spreader between the first and second positions.

In a further embodiment, a spreader of a combine for conveying crop residue rearwardly from a chopper rotor assembly includes a frame configured to be coupled to a rear portion of the combine, the frame including a top portion adapted to receive a portion of crop residue during a harvesting operation; an impellor comprising one or more blades for rotatably conveying crop residue rearwardly; an actuator controllably moved between an extended position and a retracted position, the actuator being pivotally coupled to the combine; a linkage assembly pivotally coupled to the actuator at one end and to the frame at another end; and a control system comprising a controller for controllably operating the actuator between its extended and retracted positions; wherein, the spreader is disposable in a first position when the actuator is in the extended position, and the spreader is disposable in a second position when the actuator is in the retracted position; wherein, a movement from the extended position to the retracted position induces pivotal movement of the spreader from the first position to the second position; wherein, in the second position, an accumulation of crop residue on the top portion falls off therefrom.

In one example of this embodiment, a sensor detects a position of the spreader, the sensor being in electrical communication with the controller; wherein, the controller operably controls the actuator to move in an extending direction or a retracting direction based on the position detected by the sensor. In another example, a valve is disposed in fluid communication with the actuator, the valve being operably controlled by the controller between an open position and a closed position; wherein, in the open position, hydraulic fluid is supplied to the actuator to induce movement between the first and second positions.

In a further example, the linkage assembly includes a plate pivotally coupled to the actuator, the plate defining an arcuate slot through which a pin fixed to the combine moves; a first stop is defined by a first end of the slot and a second stop is defined by a second end of the slot, the first end being opposite the second end.

In yet another embodiment, an agricultural combine with a powered residue spreader includes a pan mounted on top of residue spreader that is connected to the driving device to cause the pan to oscillate or vibrate, thus reducing friction between the residue accumulating on the pan and permitting it to slide rearward. In this arrangement, the pan is disposed behind and below a residue outlet of the combine and functions as a vibratory Conveyor to carry residue over the top of the powered residue spreader from whence it can fall upon the ground. An electrical vibrator can be coupled to the pan to generate this movement. A rotary motor can be coupled to the pan with a rotary to linear movement In another embodiment, an agricultural combine with a powered residue spreader is pivotally coupled to the rear of an agricultural combine to pivot about a generally laterally extending axis. An actuator is coupled to the powered residue spreader to cause it to pivot downward and upward with respect to the combine. The powered residue spreader is pivoted downward sufficient to permit residue accumulating on top of the spreader to slide rearward and fall on the ground. The powered residue spreader is then pivoted upward into an operating position for optimal distribution of the residue over the ground.

This operation can be automated by an electronic control unit coupled to the actuator that is programmed to periodically tip the spreader downward (dumping any residue on top) and then to upward again to its operating position. This tipping process can be automated. A sensor coupled to the electronic control unit can determine when the combine is not harvesting and/or the spreader is not spreading, and tip the spreader during these intervals.

In a further embodiment of the present disclosure, a laterally extending gap is provided above a forward upper edge of the spreader to permit residue to fall into the spreader instead of accumulating on top.

In yet a further embodiment of this disclosure, a fan and vented plenum can be fixed to the top surface of the spreader, with the fan coupled to the Plenum to fill the plenum with air under pressure, wherein an upper surface of the plenum has a plurality of vent holes passing through to permit the release of the air provided by the fan. These vent holes are positioned and sized to release the air from the plenum in a rearward direction, and thus collectively generate a flow of air that blows residue rearward and off the spreader.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
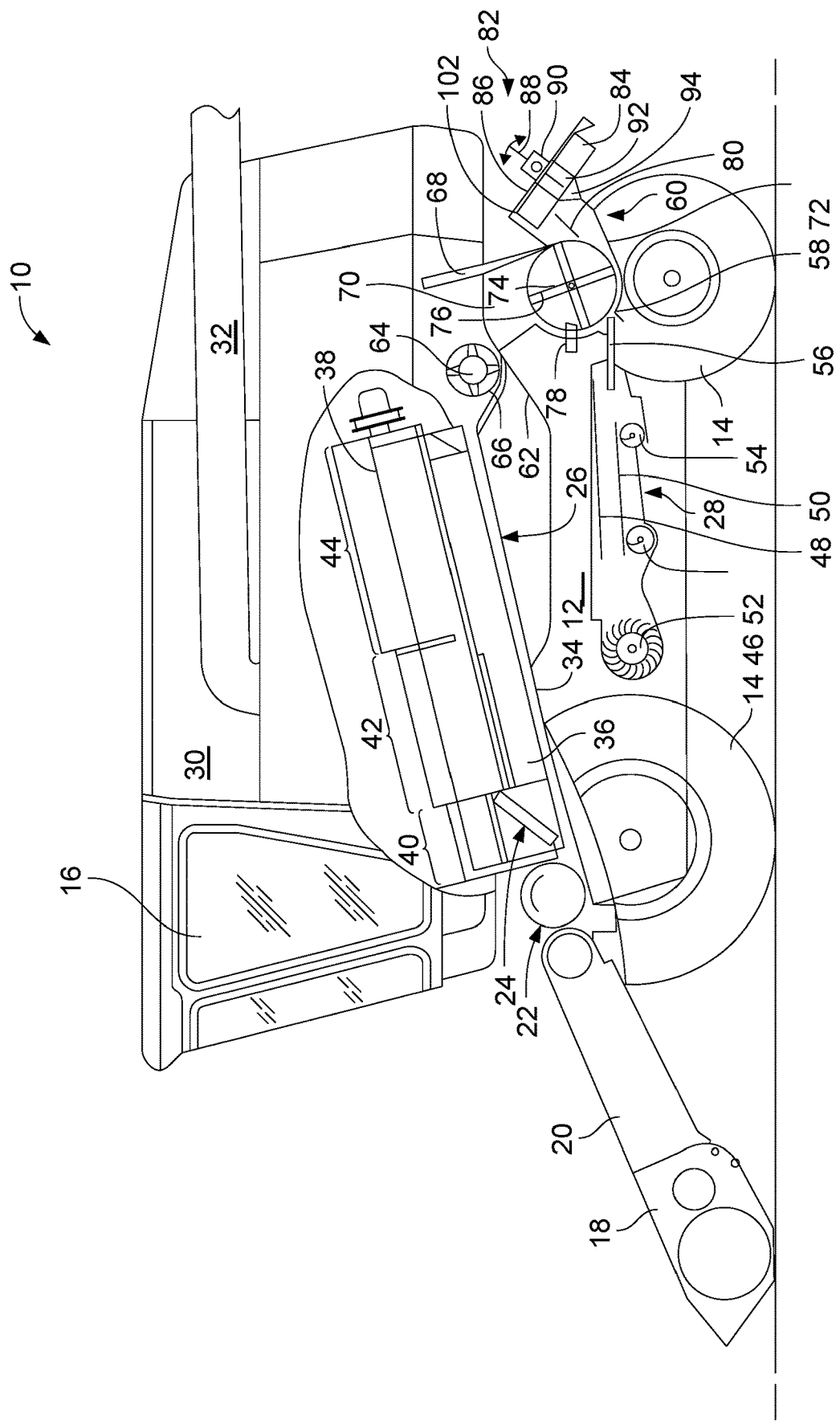
FIG. 1 is a side view of a combine having a powered residue spreader.

An example of an agricultural combine is illustrated in FIG. 1. Here, an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutter head 18 is disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by means of an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by means of an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

Figure 2:
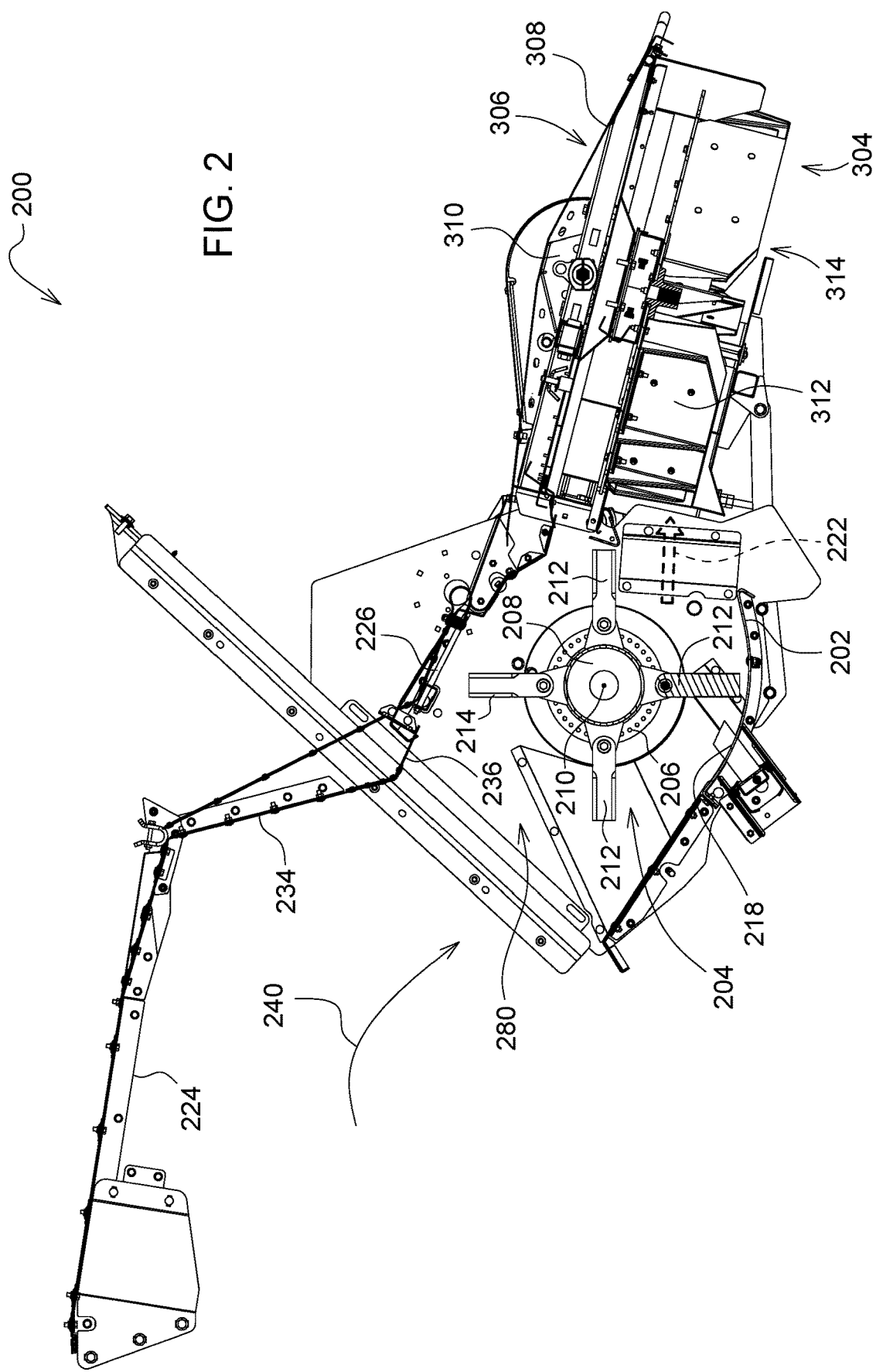
FIG. 2 is a partial section of a side view of a rear portion of a combine.

Referring to FIG. 2, a rear portion of a combine 200 is shown. Here, a chopper housing 202 and a chopper rotor assembly 204 are illustrated. The chopper housing 202 may be formed of a pair of opposing side walls 216. In FIG. 2, only one side wall 202 is shown and the other is removed to better illustrate the features of the combine inside of the chopper housing 202. In addition to the side walls, the housing 202 may include a floor or inlet floor 218. The inlet floor 218 may be angled or declined such that air is able to flow over the inlet floor 218 and into the chopper rotor assembly 204. The inlet floor 204 defines a portion of an inlet 220 to the chopper housing 202.

The combine 200 may include a roof or rear hood 224 which is disposed forward of the chopper rotor assembly 204. Air from the separating section 44 and the sieves 48, 50 may be directed into contact or toward the rear hood 224. As shown, the rear hood 224 may be angled or oriented in a downward and rearward direction in FIG. 2 thereby directing the air flow towards the inlet 220 of the chopper housing 202.

The combine 200 may further include side walls (not shown) which, in combination with at least the rear hood 224, defines an interior thereof. The side walls 216 of the chopper housing 202 may be complementary with and generally coplanar with the side walls of the combine 200. In other words, the chopper housing 202 may have a similar width as that of the combine 200.

The chopper rotor assembly 204 may include a chopper rotor 206 for chopping the residue received from the cleaning system. The chopper rotor 206 may include a central hub 208 and a plurality of blades 212 coupled thereto and protruding radially therefrom. Each of the plurality of blades 212 may be spaced relative to one another in an arrangement along the width of the chopper rotor 206. The chopper rotor 206 is disposed within the chopper housing 202 and may rotate in a counterclockwise direction about a pivot axis 210. The outer edge of the plurality of blades 212 define an outer circumference or boundary during rotation. Each of the plurality of blades 212 may include a sharpened portion with a plurality of teeth 214 for chopping the residue received from the cleaning system 28. In the embodiment of FIG. 2, there are teeth 214 on both sides of each blade 212. In other embodiments, however, there may only be teeth formed on the side of the blade configured to come into contact with the residue as the chopper rotor 206 rotates in the counterclockwise direction about the pivot axis 210.

Although not shown in FIG. 2, in one embodiment the chopper rotor assembly 204 may also include one or more stationary blades affixed to the inlet floor 218 of the chopper housing 202. In this embodiment, the stationary blades may be arranged in a direction of the width of the chopper rotor 206 and spaced accordingly such that the stationary blades do not come into contact with the blades 212 of the chopper rotor 206. Interaction between the plurality of blades 212 of the chopper rotor 206 and the stationary blades can create a chopping action.

As material is chopped by the chopper rotor 206, the material or residue is blown further rearward through an outlet or discharge outlet 222 of the chopper housing 202 until it is engaged by a residue spreader 304. The residue spreader 304 may include an impellor 314 having one or more blades 312 or paddles for spreading the material rearward of the combine 200 where the material may be collected or picked up by another machine or vehicle.

In the embodiment of FIG. 2, there are no rear vents defined in the rear hood 224 similar to those in conventional combine harvesters. Here, air flow may be forced to flow through the chopper rotor 206 and discharge through the outlet 222 of the chopper housing 202. As shown, air generated by the blower 46 may follow a first portion of a flow path defined by arrow 240. The flow path may partially be defined along the rear hood 224 and it also may flow along the floor inlet 218. The entirety of the air flow from the blower 46 therefore passes through the inlet 220 of the chopper housing 202 and out of the interior of the combine 220 via the outlet 222, which is contrary to many conventional combine designs such as the one described in the '315 patent.

In the illustrated embodiment of FIG. 2, the chopper housing 202 may also include a chopper roof structure 226 which is located above the chopper rotor 206. The chopper roof structure 226 may have a portion thereof which is substantially flat, as shown in FIG. 2. In particular, the chopper roof structure 226 of FIG. 2 may include a first section 234 which is angled downwardly towards a rear of the combine. The first section 234 may be coupled to the side walls of the chopper housing 202. A second section 236 of the chopper roof structure 226 may be coupled to the side walls of the chopper housing 202 via a mounting bracket (not shown) or the like.

The chopper roof structure 226 may be arranged to extend across the entire width of the chopper housing 202 or combine 200. Thus, with the chopper roof structure 226 being in close proximity to the blades 212 of the chopper rotor 206, air flow generated by the blower 46 passes through the inlet 220 of the chopper housing 202 and through the chopper rotor 206 before escaping through the outlet 222 of the combine 200.

Figure 3:
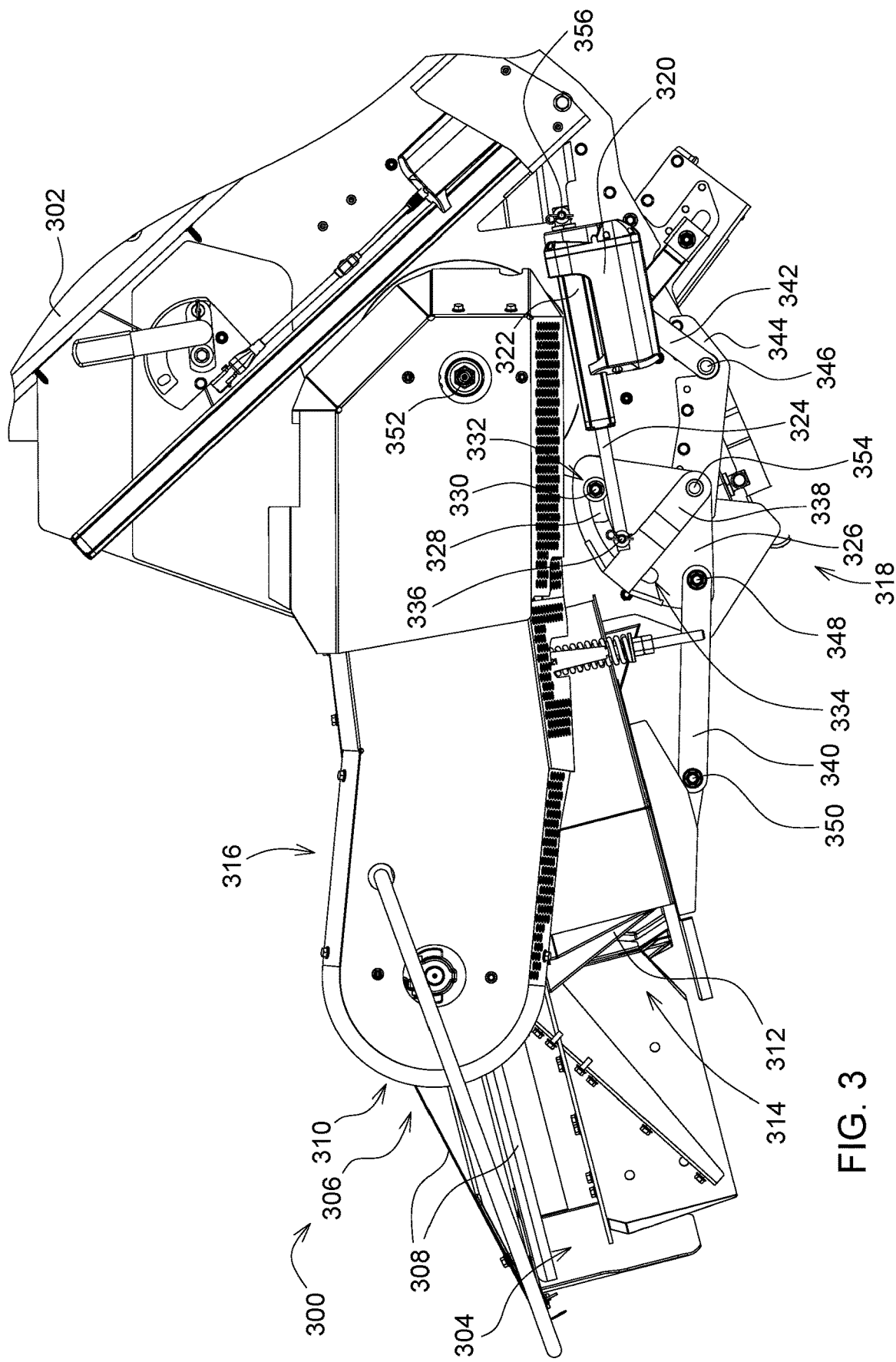
FIG. 3 is a partial side view of the residue spreader disposed in a first, working position.
Figure 4:
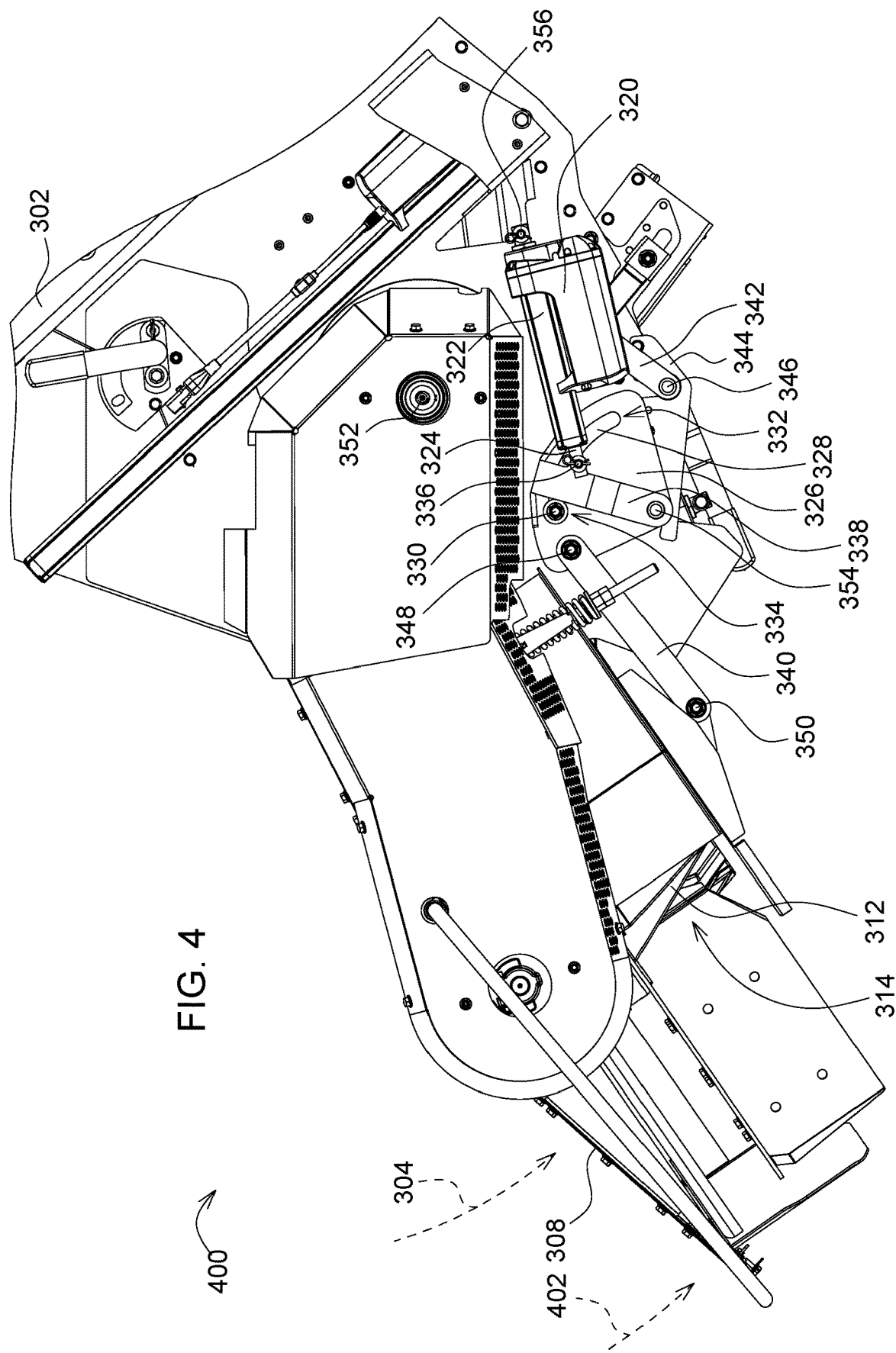
FIG. 4 is a partial side view of the residue spreader disposed in a second, tilted position.

Referring to FIGS. 2-4, an embodiment of a residue chopper and residue spreader arrangement is illustrated in which portions of the various aspects of the present disclosure are described herein. In FIGS. 2-4, crop residue from the threshing cleaning and separating portions of an agricultural combine 300 are deposited in an inlet of an agricultural chopper rotor assembly 204 near a rearward portion 302 of the combine 300.

The agricultural chopper rotor assembly 204 includes the central rotor 206 to which pendulous blades 212 are attached. The central rotor 206 extends horizontally and perpendicular to a direction of travel of the agricultural combine 300 as it travels through the field harvesting crops.

Large pieces of residue fall downward into a gap between the rotor 206 and a sheet-metal floor 218 of the chopper housing 202. As the chopper rotor 206 rotates (counterclockwise in FIG. 2) it chops these large pieces of residue and throws them rearward into a residue spreader 304.

The residue spreader 304 may include a pair of impellors 314 located in a side-by-side arrangement. These impellors 314, or rotors, include a flat, generally circular disc to which a plurality of downwardly extending blades 312 are attached. The impellors 314 are driven in rotation about a central axis by motors 310. The motors 310 are fixed to and supported for rotation on a frame 308. The frame 308 is pivotally coupled to and supported on the frame of the agricultural combine 300.

The chopped residue leaves the chopper housing 202 and is received between the blades 312 and the bottom surface of the disc. As the blades 312 and discs rotate, they throw the chopped residue rearward and outward away from the spreader 304, whereupon the chopped residue falls in an even pattern upon the ground. It should be noted that the chopped residue is propelled onto the underside of the discs for spreading, and not the upper surfaces of the discs.

This describes how large, heavy residue travels through the combine, into the chopper, is chopped, and is distributed over the ground.

Lighter residue, however, follows a different path through the chopper 206 and the spreader 304. Lighter residue is not carried to the bottom of the chopper and through the chopper blades 312, but is light enough to be carried upward with the flow of air from the combine 300. This flow of air passes over a top portion of the chopper rotor 206 and between the blades 212 that extend outward from the top of the chopper rotor 206. This lighter residue exits the housing 202 of the chopper rotor 206 above the spreader 304 and is carried across a top area or surface 306 of the spreader 304. As the flow of air exits the chopper housing 202, the flow of air widens, its velocity dissipates, and it is no longer able to carry the light residue further. As a result, the light residue falls on top of the spreader 304.

At first, small portions of the light residue remains on top (i.e., top area or region 306) of the spreader 304. These portions of light residue cause further turbulence and velocity reduction in the flow of air passing over the spreader 304. This further turbulence and reduction in velocity causes even more light residue to accumulate on top of the spreader 304. After a while, mounds of light residue can accumulate and completely redirect the flow of air exiting the chopper housing 202.

A number of solutions or designs have been considered for reducing the accumulation of residue on top of the spreader 304. In FIGS. 3 and 4, one such embodiment is illustrated. In FIG. 3, the spreader 304 is depicted in a working or operating position 316. In this position, chopped residue may be discharged from the chopper housing 202 via the chopper rotor 206, received by the spreader 304, and the impellors 314 may rotate to further throw the residue rearward from the spreader 304 and onto the ground, as described above. It is also in this position 316 where the spreader 304 or at least upper portions thereof are substantially level or parallel with respect to the direction of travel such that the lighter residue is able to accumulate thereon. In order to reduce the accumulation of residue, the spreader 304 may be designed with a pair of linkage assemblies 318 on each side thereof. With each linkage assembly 318 may be an actuator 320 capable of manipulating the linkage assembly 318 to induce pivotal movement of the spreader 304. In FIG. 4, for example, the spreader 304 is shown in its tilted or "dump" position 400 whereby the spreader 304 may be pivoted about a pivot in a counterclockwise direction 402. This will be further described below.

In FIG. 3, the actuator 320 may be electric, hydraulic, electro-mechanical, mechanical, pneumatic, or any other known type. The actuator 320 may include a cylinder body 322 and a rod 324 that extends and retracts relative thereto. The cylinder body 322 may be pivotally coupled to the combine 300 via pivot pin 356, whereas the rod 324 may be coupled to a first plate 326 via a pin connector 336. The pin connector 336 may further be coupled to a first link 338, which will be described further below.

The first plate 326 may include an arc-shaped slot 328 defined therein, as illustrated. A pin 330 in the shape of a bolt or tab may slide within the slot 328 as the rod 324 extends and retracts. The pin 330 may be coupled to the combine 300 such that it remains fixed relative to movement by the first plate 326. In other words, as the actuator 320 moves the rod 324 between its extended and retracted positions, the first plate 326 may pivot back and forth about pivot pin 354. The movement of the plate 326 happens as in an arcuate path defined by the slot 328.

The slot 328 may include a first stop 332 and a second stop 334 at each end thereof to protect the actuator 320 from be exposed to significant loads during operation. Thus, in FIG. 3, the rod 324 is in its extended position and the pin 330 is disposed against the first stop 332. In FIG. 4, however, the rod 324 is in its retracted position and the pin 330 is disposed against the second stop 334. This, in part, details the pivotal movement of the spreader 304 between its normal, operating position of FIG. 3 and its tilted or pivoted position 400 of FIG. 4. In the tilted or pivoted position of FIG. 4, any residue that accumulates on top of the spreader 304 may fall rearwardly therefrom and onto the ground. Thus, the residue does not continue to build up or accumulate on top of the spreader 304 and block air flow from the chopper housing 202.

In one example, the spreader 304 may be pivoted between 10-90° from its operating position. In another example, the spreader 304 may be pivoted between 25-90°. In a further example, the spreader 304 may be pivoted between 14-33°. In any event, these are only examples and the spreader 304 may be pivoted as far as necessary to dump or remove the accumulated residue from its upper surface.

In FIGS. 3 and 4, the aforementioned first link 338 is shown coupled to the first plate 326. It may be welded or connected at the first plate 326 closest to the slot 328 and via connection 336. Moreover, the first link 338 and plate 326 may be coupled to the combine 300 pivot pin 354. Movement of the plate 326, however, does not induce any contact or interference between the pin 330 and first link 338.

A second link 340 is also coupled to the first plate 326 via pivot pin connection 348. The second link 340 is further coupled at its opposite end to the spreader 304 (e.g., the spreader frame 308) via pivot pin connector 350. The connection between the second link 340 and spreader 304 at pivot pin connector 350 further induces pivotal movement of the spreader 304 between its operating position and tilted position 400.

The linkage assembly 318 further includes a third link 342 and a fourth link 344, as shown in FIGS. 3 and 4. Both links may be coupled to one another via pin connection 346. Moreover, the links may be coupled to the combine 300 or spreader 304.

Although not shown in great detail, one or shafts 352 may operably drive one or more of the spreader 304 or combine 300, as shown in FIGS. 3 and 4.

Figure 5:
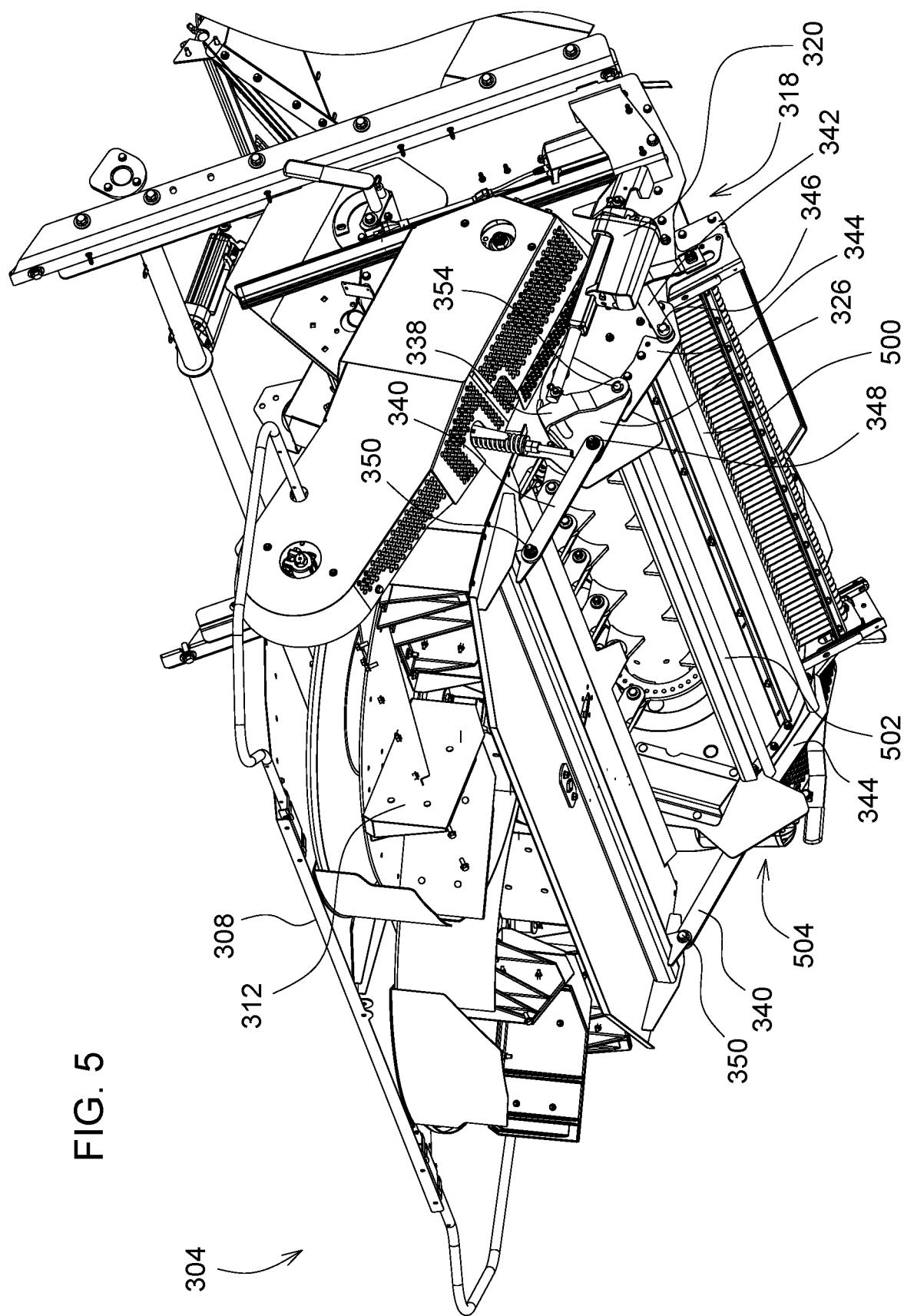
FIG. 5 is a bottom isometric view of the residue spreader.

In FIG. 5, the combine 300 and spreader 304 are shown from below. As noted above, there may be a pair of linkage assemblies on each side of the spreader 304. In order to ensure smooth pivotal movement of the spreader 304 between its different positions, a linkage assembly 504 on an opposite side of the spreader 304 from the linkage assembly 318 in FIGS. 3 and 4 is shown. The pair of linkage assemblies 318, 504 may be coupled to one another via a first rod 500 and a second rod 502. The first rod 500 may be coupled at pin connection 346 of both linkage assemblies, and the second rod 502 may be coupled at pivot pin connection 354. As such, both linkage assemblies may operate synchronously with one another to ensure smooth pivotal movement of the spreader 304.

Figure 6:
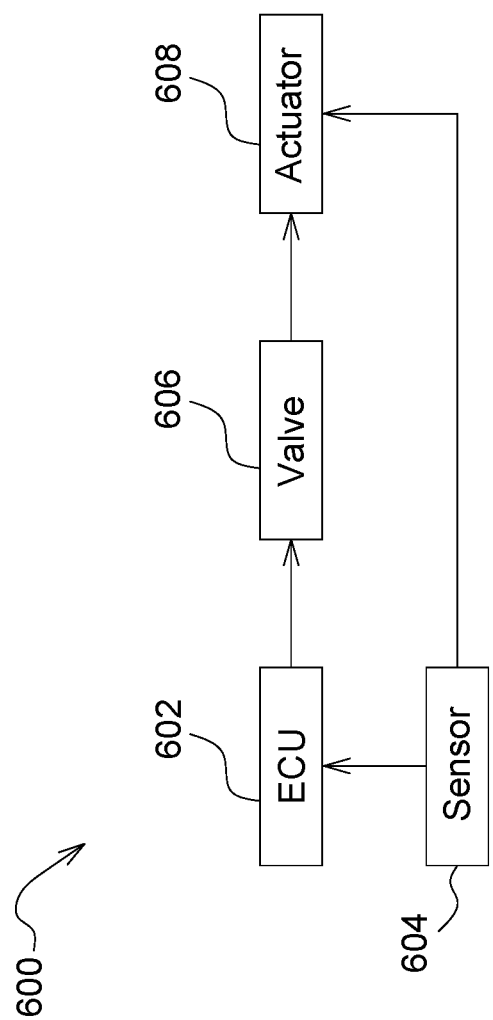
FIG. 6 is a schematic of a control system for controlling the position of the residue spreader.

Turning to FIG. 6, a control schematic 600 is shown for controlling the pivotal movement of the spreader 304. Here, in this simplified schematic 600, a controller or electronic control unit (ECU) 602 is shown. The ECU 602 may be a vehicle controller, machine controller, or any other known controller. In one embodiment, the ECU 602 is a separate controller from other controllers that control the combine 300. In this embodiment, the ECU 602 may be in electrical communication with the other controllers via a data bus or communication link such as a J-1939 protocol. Other communication links may be possible.

A sensor 604 may be disposed on the combine 300 or spreader 304 for detecting a position of the spreader 604. For instance, it may be a proximity sensor located on the first plate 326 capable of detecting a position of the pin 330 relative to the slot 328 and the first and second stops 332, 334. The sensor 604 may be a Hall Effect sensor or any other known type of sensor. In one embodiment, the sensor 604 may comprise two or more sensors. For instance, one sensor may detect a position of the pin 330 relative to the first stop 332 and another sensor may detect a position of the pin 330 relative to the second stop 334. In a further embodiment, one or more sensors 604 may detect an orientation of the spreader 304 relative to a horizontal plane that defines the spreader 604 in its working or operating position of FIG. 3. In any event, the one or more sensors 604 are in electrical communication with the ECU 602 to detect a position of the spreader 304.

Although not shown, a sensor 604 may be configured to detect an amount of crop residue collecting on top of the spreader 304. For instance, the sensor 604 may detect a weight or density of the residue, and communicate this to the ECU 602. Alternatively, the sensor 604 may comprise a camera or other visual-detecting means and communicate images to the controller 602. Moreover, the camera may send images or live video to a screen or display in a cab of the combine such that the operator can see how much residue is collecting on the spreader. In some cases, the operator may be able to manually send an instruction to the controller 602 to cause the spreader to pivot to its tilted position to remove the residue. The aforementioned examples are not intended to be limiting, as any type of sensor or control system may be used to control actuator movement and thereby operably control the spreader between its operating position and tilted position.

In the embodiment of FIG. 6, the control system 600 may be an electric-hydraulic system in which a hydraulic actuator 608 controls movement of the spreader 304. As such, the actuator 608 may be fluidly coupled to a valve 606 which supplies hydraulic fluid to the actuator 608 based on commands from the ECU 602. The valve 606 may be in fluid communication with a fluid reservoir or supply for supplying the fluid to the actuator 608.

FIG. 6 represents an electro-hydraulic control system 600, but it is contemplated within this disclosure that the control system may be an electrical control system in which the actuator 320 is an electric actuator. Alternatively, the system may be an electro-mechanical control system, a mechanical control system, a pneumatic control system, or any combination thereof. Thus, the type of control system is not intended to limit the scope of this disclosure.

The ECU 602 can be programmed to periodically tilt and raise the spreader 304 at desired events or conditions, intervals, and the like. The ECU 602 can be programmed, for example, to tilt and raise the spreader 304 when the combine harvesting system is paused (such as when the combine enters a headland of the field), or when the harvesting head is lifted, or when the combine traverses an already-harvested portion of the field, etc. Moreover, the ECU 602 may track how long the machine has been harvesting and after so many hours trigger a tilting operation.

The ECU may also be programmed to perform a pivoting function over a period of time, such as every 10 to 15 minutes, for example. In any event, the ECU 602 may be programmed to detect a tilt event or characteristic (e.g., harvesting system is paused, head is lifted, period of time times out, etc.), and upon detecting such an event, the ECU 602 may control the actuator 320 and linkage assembly 318, 504 to pivot the spreader 304 to its tilted position of FIG. 4 to allow the residue to fall off the spreader 304. Moreover, the ECU 602 may trigger the spreader 304 to return to its operating position of FIG. 3 after a second period of time at which the spreader 304 was in its tilted position.

This system, and in particular the ECU 602, may be controlled or programmed differently. The aforementioned description is intended as only one example for controlling the spreader 304 and removing residue that collects on the top surface thereof.

While the above description address one embodiment for removing or reducing the accumulation of residue on the top of a spreader, this disclosure is not limited to that embodiment. In another embodiment (not shown), a generally rectangular pan is supported on a frame that is mounted on top of the spreader. The pan is disposed generally horizontally and has an upwardly facing surface. It is this surface over which the light residue passes without resistance. Once the light residue is passed over the top surface of the pan, it reaches the rear edge of the pan and falls upon the ground.

A drive mechanism (not shown) is coupled to the frame and causes the frame to oscillate forward and rearward on supports (not shown) that are fixed to the upper surface of the spreader. A motor (not shown) drives a driveshaft in rotation, and an offset crank coupled to the driveshaft causes the frame (and the pan fixed to the top of the frame) to oscillate in a fore-and-aft direction. There are other ways to move the pan with respect to the spreader, however. One arrangement would be using resilient mounts to couple the pan to the spreader and driving an unbalanced weight coupled to the pan, thus causing the pan to oscillate. Another alternative would be using a vibrator coupled to the pan, such as those used with vibratory feeders or vibratory conveyors.

In a further embodiment, an arrangement for preventing residue buildup on the upper surface of the spreader may be such that the spreader has a second set of blades (not shown) that are fixed to and extend upward from the discs (not shown). The blades (not shown) are oriented and arranged on discs in the same fashion as the impellor blades 312 with one difference: the blades (not shown) are fixed to and extend upward from the discs, and the impellor blades 312 are fixed to and extend downward from the discs.

Light residue entrained in the flow of air exiting and passing over the top of the chopper rotor 206 is carried out the rear of the chopper housing 202, falls downward off the rear edge of the top of the chopper housing 202 and is deposited on the top surface of the discs. The discs are spinning, and the blades (not shown) extending upward from the top surface of the discs hit the light residue and propel it outward.

In yet a further embodiment of the present disclosure, an arrangement for preventing residue buildup on the upper surface of the spreader may be such that the spreader has a plenum (not shown) that extends generally horizontally and laterally across the top of the spreader. An air inlet (not shown) is provided at the rear of the spreader to permit air to enter the plenum (not shown). Fans (not shown) are disposed between the two motors 310 that drive the discs in rotation.

Fans (not shown) suck air into the inlet (not shown) and expel it into the plenum (not shown). The plenum (not shown) is defined by a concave surface fixed to the top of the spreader, and a cover (not shown). The cover has a plurality of apertures (not shown) that extend across the entire cover. These apertures are disposed at an angle such that air passing from the plenum through the apertures is directed rearward and across the top of the spreader. By disposing the apertures at an angle, any light residue falling upon the cover is carried rearward by the force of the air, off the rear of the spreader and onto the ground.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A spreader of a combine for conveying crop residue rearwardly from a chopper rotor assembly, comprising:
   a frame configured to be coupled to a rear portion of the combine, the frame including a top portion adapted to receive a portion of crop residue during a harvesting operation;
   an impellor comprising one or more blades for rotatably conveying crop residue rearwardly;
   an actuator controllably moved between an extended position and a retracted position, the actuator being pivotally coupled to the combine;

a linkage assembly pivotally coupled to the actuator at one end and to the frame at another end, wherein the linkage assembly includes a slot through which a pin fixed to the combine moves;

wherein, the spreader is disposable in a first position when the actuator is in the extended position, and the spreader is disposable in a second position when the actuator is in the retracted position;

wherein, a movement from the extended position to the retracted position induces pivotal movement of the spreader from the first position to the second position;

wherein, in the second position, an accumulation of crop residue on the top portion falls off therefrom.

2. The spreader of claim 1, wherein the actuator comprises an electric actuator, a hydraulic actuator, a mechanical actuator, an electro-hydraulic actuator, a pneumatic actuator, or a combination thereof.

3. The spreader of claim 1, wherein the linkage assembly comprises a plate pivotally coupled to the actuator, the plate defining the slot as an arcuate slot through which the pin fixed to the combine moves.

4. The spreader of claim 3, further comprising a first stop defined by a first end of the slot and a second stop defined by a second end of the slot, the first end being opposite the second end.

5. The spreader of claim 4, wherein the pin is located at the first stop in the first position and at the second stop in the second position.

6. The spreader of claim 4, wherein the plate pivots with respect to the combine as the pin moves within the slot between the first and second ends.

7. The spreader of claim 3, wherein the linkage assembly comprises a first link having a first end and a second end, the first end being pivotally coupled to the plate and the second end being coupled to the frame.

8. The spreader of claim 1, further comprising:
a second actuator disposed on an opposite side of the spreader from the first actuator and being pivotally coupled to the combine, the second actuator controllably moved between an extended position and a retracted position;
a second linkage assembly disposed on the same side of the spreader as the second actuator, the second linkage assembly pivotally coupled to the second actuator at one end and to the frame at another end.

9. The spreader of claim 8, further comprising at least one rod coupling the first actuator and the second actuator to one another, the at least one rod configured to synchronously control pivotal movement of the spreader between the first and second positions.

10. The spreader of claim 1, further comprising a control system for controlling the actuator between its extended and retracted positions.

11. A combine harvester, comprising:
a housing including a rear hood and opposite side walls which define an interior;
a blower disposed in the interior of the housing, the blower configured to generate an air stream in a substantially rearward direction;
a cleaning system disposed in the interior at a location rearward of the blower, the cleaning system separating residue from a crop material such that the residue is transported via the air stream rearwardly to be discharged from the housing;
a chopper rotor assembly disposed within the interior and comprising a chopper rotor mounted about a hub for rotation about an axis defined by the hub and a plurality of blades coupled to the hub of the chopper rotor for chopping the residue as it is received via the air stream;
a chopper housing disposed within the interior and defining an inlet opening for receiving the residue being transported via the air stream from the cleaning system and an outlet spaced rearward from the chopper rotor for discharge of the chopped residue from the interior of the housing;
a spreader configured to convey crop residue rearwardly from the chopper rotor assembly, the spreader including a frame coupled to a rear portion of the combine and having a top portion adapted to receive a portion of crop residue during a harvesting operation;
an impellor of the spreader comprising one or more blades for rotatably conveying crop residue rearwardly;
an actuator controllably moved between an extended position and a retracted position, the actuator being pivotally coupled to the combine;
a linkage assembly pivotally coupled to the actuator at one end and to the frame at another end, wherein the linkage assembly include a slot through which a pin fixed to the combine moves;
wherein, the spreader is disposable in a first position when the actuator is in the extended position, and the spreader is disposable in a second position when the actuator is in the retracted position.

12. The combine harvester of claim 11, wherein a movement from the extended position to the retracted position induces pivotal movement of the spreader from the first position to the second position.

13. The combine harvester of claim 11, wherein the linkage assembly comprises a plate pivotally coupled to the actuator, the plate defining the slot as an arcuate slot through which the pin fixed to the combine moves.

14. The combine harvester of claim 13, further comprising a first stop defined by a first end of the slot and a second stop defined by a second end of the slot, the first end being opposite the second end.

15. The combine harvester of claim 14, wherein the pin is located at the first stop in the first position and at the second stop in the second position.

16. The combine harvester of claim 11, further comprising:
a second actuator disposed on an opposite side of the spreader from the first actuator and being pivotally coupled to the combine, the second actuator controllably moved between an extended position and a retracted position;
a second linkage assembly disposed on the same side of the spreader as the second actuator, the second linkage assembly pivotally coupled to the second actuator at one end and to the frame at another end; and
at least one rod coupling the first actuator and the second actuator to one another, the at least one rod configured to synchronously control pivotal movement of the spreader between the first and second positions.

17. A spreader of a combine for conveying crop residue rearwardly from a chopper rotor assembly, comprising:
a frame configured to be coupled to a rear portion of the combine, the frame including a top portion adapted to receive a portion of crop residue during a harvesting operation;
an impellor comprising one or more blades for rotatably conveying crop residue rearwardly;
an actuator controllably moved between an extended position and a retracted position, the actuator being pivotally coupled to the combine;

a linkage assembly pivotally coupled to the actuator at one end and to the frame at another end, wherein the linkage assembly includes a slot through which a pin fixed to the combine moves; and a control system comprising a controller for controllably operating the actuator between its extended and retracted positions;

wherein, the spreader is disposable in a first position when the actuator is in the extended position, and the spreader is disposable in a second position when the actuator is in the retracted position;

wherein, a movement from the extended position to the retracted position induces pivotal movement of the spreader from the first position to the second position;

wherein, in the second position, an accumulation of crop residue on the top portion falls off therefrom.

18. The spreader of claim 17, further comprising a sensor for detecting a position of the spreader, the sensor being in electrical communication with the controller;

wherein, the controller operably controls the actuator to move in an extending direction or a retracting direction based on the position detected by the sensor.

19. The spreader of claim 17, further comprising a valve disposed in fluid communication with the actuator, the valve being operably controlled by the controller between an open position and a closed position;

wherein, in the open position, hydraulic fluid is supplied to the actuator to induce movement between the first and second positions.

20. The spreader of claim 17, wherein:

the linkage assembly comprises a plate pivotally coupled to the actuator, the plate defining the slot as an arcuate slot through which the pin fixed to the combine moves;

a first stop is defined by a first end of the slot and a second stop is defined by a second end of the slot, the first end being opposite the second end.

\* \* \* \* \*